C. F. DUTTON.
GAS ESCAPE VALVE FOR BALLOONS.
APPLICATION FILED MAR. 29, 1918.
1,289,703.
Patented Dec. 31, 1918.
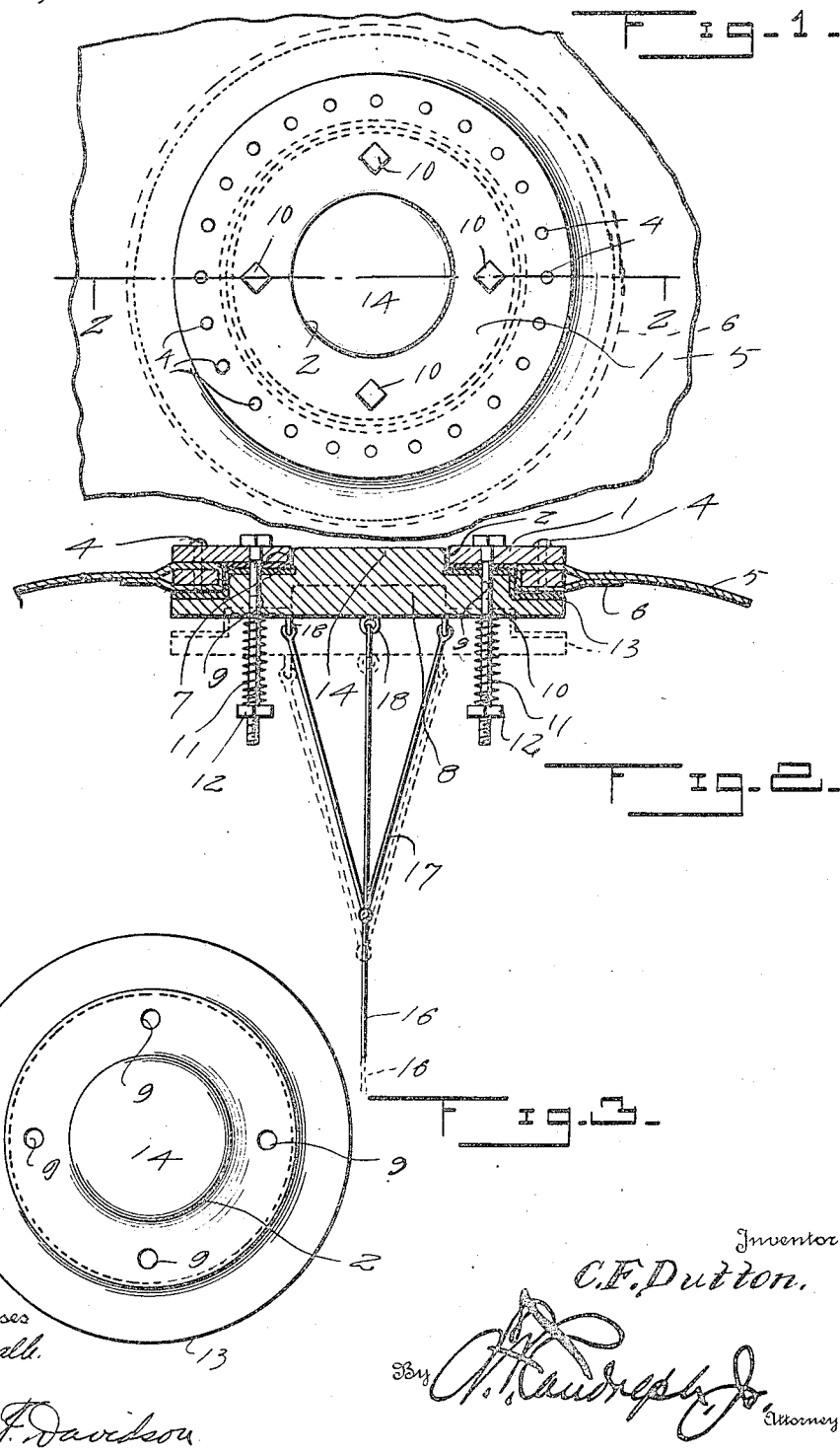

UNITED STATES PATENT OFFICE.

CHESTER F. DUTTON, OF HANCOCK, NEW HAMPSHIRE.

GAS-ESCAPE VALVE FOR BALLOONS.

1,289,703.

Specification of Letters Patent.

Patented Dec. 31, 1918.

Application filed March 29, 1918. Serial No. 225,519.

*To all whom it may concern:*

Be it known that I, CHESTER F. DUTTON, a citizen of the United States, residing at Hancock, in the county of Hillsborough and State of New Hampshire, have invented certain new and useful Improvements in Gas-Escape Valves for Balloons; and I do hereby declare the following to be a full, clear, and exact description of the invention, such as will enable others skilled in the art to which it appertains to make and use the same.

This invention relates to improvements in valves for balloons and has for one of its objects the provision of a device of this character whereby the gas of a balloon may be permitted to escape therefrom as desired for causing the balloon to descend as rapidly as desired.

Another object of this invention is the provision of means for securing the valve seat to the bag of the balloon so that the gas will be prevented from escaping about the same.

A further object of this invention is the provision of a valve for balloons of the above stated character which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description, and accompanying drawing, in which:—

Figure 1 is a plan view of a valve for balloons constructed in accordance with my invention, Fig. 2 is a sectional view taken on the line 2—2 of Fig. 1, and Fig. 3 is a plan view of the valve proper.

Referring in detail to the drawing, the numeral 1 indicates a circular plate having a central opening 2. An annular ring 3 is positioned against the under face of the plate 1 and has its periphery in alinement with the periphery of the plate and is secured thereto by fastening elements 4. Before the ring 3 is applied to the plate 1, the material 5 from which the balloon is constructed is passed about the ring 3 as clearly illustrated in the drawing and secured to itself as clearly illustrated at 6 thereby connecting the plate to the balloon in such a manner that the gas thereof will be prevented from escaping around the connection. The plate 1 is provided with a lining or packing 7 upon its inner face and extends from the inner periphery of the ring 3 to the opening 2 and which plate and ring form a valve seat for a valve 8. The valve 8 is of circular formation and is provided with spaced circularly arranged openings 9 to receive supporting bolts 10 that are carried by the plate 1. The bolts 10 have mounted thereon expansion springs 11 which are interposed between nuts 12 and the inner face of the valve 8 for the purpose of urging the valve into engagement with the valve seat. The outer or seating face of the valve 8 is provided with cut away portions over which is positioned a packing 13 and which is secured thereto in any well known manner. The cut away portions of the valve which form the shoulders coöperate with the shoulders formed by the plate 1 and ring 3 and when moved in engagement with each other an interlocking action is established between the valve and the valve seat. The cut away portions that define the shoulders of the valve also provides a cylindrical portion 14 that is adapted to tightly fit the wall of the circular opening 2 of the plate 1 when the valve is in a seated position.

A controlling cable 16 extends through the balloon in any well known manner and has connected thereto a plurality of branch cables 17 that are in turn connected to eyes 18 secured to the valve 8, whereby upon pulling on the cable 16 the valve will be unseated permitting the gas within the balloon to escape and immediately upon releasing the cable 16 the springs 11 force the valve into seated position.

While I have shown and described the preferred embodiment of my invention, it will be understood that minor changes in construction, combination, and arrangement of parts may be made without departing from the spirit and scope of the invention as claimed.

What I claim as new is:—

A valve for balloons comprising a circular plate having a centrally arranged opening, an annular ring having the material of the balloon passed thereabout and secured to the inner face of the plate and having its inner periphery concentric with the inner periphery of said plate to coöperate with the plate in forming spaced valve seats, members carried by said plate, a circular valve slidably mounted on said members, springs forcing said valve in engagement with the valve seats, said valve having cut away portions to define shoulders to coöperate with the spaced valve seats and also to form a circular portion adapted to snugly fit the wall of the central opening of said plate, and means for disengaging the valve from the valve seats.

In testimony whereof I affix my signature in presence of two witnesses.

CHESTER F. DUTTON.

Witnesses:
WILLIAM D. FOGG,
EZRA R. DUTTON.